Patented Mar. 19, 1940

2,193,814

UNITED STATES PATENT OFFICE 2,193,814

NICKEL BORATE CATALYST

Llewellyn Heard, Hammond, Ind., assignor to Standard Oil Company, Chicago, Ill., a corporation of Indiana No Drawing. Application November 26, 1937, Serial No. 176,631

6 Claims. (Cl. 23—233)

This invention relates to catalysts. More particularly it relates to catalysts for the dehydrogenation of hydrocarbons and other organic compounds, and still more particularly it relates to complex catalysts characterized by the presence of nickel borate and to their manufacture.

It is an object of this invention to provide catalysts which can be used to dehydrogenate hydrocarbons, particularly commercial naphthas and other stocks boiling within about the gasoline range, which will operate efficiently and which will have long catalyst lives. It is also an object of this invention to provide catalysts for other purposes as will hereinafter appear. Other and more specific objects of the invention will become apparent as the description thereof proceeds.

A great many catalysts have been tested by me for use in dehydrogenation reactions. In these tests a sweetened 8-carbon atom cut from a commercial Mid-Continent naphtha was fed at ordinary pressures through a heated catalyst tube. Unreacted hydrocarbons as well as hydrocarbon products were condensed by the successive use of an air condenser, a water condenser and a carbon dioxide-acetone condenser. The hydrogen was then collected and measured in an effusiometer. The refractive index and other properties of the resulting products were studied in order to follow the course of the reaction.

Many borate catalysts, particularly tetraborate catalysts, were studied in the course of this work, and it was found that, in general, the metallic borates were not satisfactory dehydrogenation catalysts. These borates were prepared in most instances by dissolving a soluble metal salt such as the chloride, nitrate, sulfate or acetate of a heavy metal in water and then adding to this solution an aqueous solution of sodium tetraborate, commonly known as borax. The metallic borates thus precipitated were filtered, washed, dried, and tested as dehydrogenation catalysts as described in the preceding paragraph.

As previously indicated, these products were for the most part ineffective. Thus, for example, iron tetraborate containing some excess of ferric nitrate from the precipitation reaction, was found to be worthless. Similarly, pure ferric tetraborate obtained by thorough washing of the precipitate was found to be not sufficiently active for use in dehydrogenation. The same was true of cobalt tetraborate and the same was true of mixed cobalt and ferrous tetraborates precipitated by sodium tetraborate from a solution of equimolal proportions of cobalt sulfate and ferrous sulfate. Pure uranium tetraborate was likewise ineffective, as was pure calcium tetraborate. The product precipitated by sodium tetraborate from a solution of chromium nitrate was also found to be ineffective.

The outstanding exception to the non-effective nature of the borates as dehydrogenation catalysts are the nickel borates, particularly nickel tetraborate. This catalyst is an extremely effective dehydrogenation catalyst, but it is altogether too active for satisfactory commercial use. It not only breaks C—H linkages with great facility, but likewise breaks C—C linkages and precipitates carbon which masks the catalyst and necessitates revivification after an extremely short run.

I have found, however, that nickel tetraborate can be used as a promoter with relatively inactive substances to give an unusually excellent dehydrogenation catalyst.

The preferred example of this is a catalyst containing the mixed or double tetraborates of nickel and cobalt. The cobalt tetraborate should be present in considerable excess and I prefer to use from 10 to 25 mols of cobalt tetraborate to one mol of nickel tetraborate. A catalyst containing 7.5 mols of cobalt compound to one of nickel compound forms carbon with undesirable rapidity. The ratio of 15 mols cobalt tetraborate to one mol nickel tetraborate has given particularly good results. This catalyst can be prepared by mixing a solution consisting of 87 grams of $CoSO_4 \cdot 7H_2O$ and 5 grams of $Ni(C_2H_3O_2)_2 \cdot 4H_2O$ in 4,000 cc. of water with stoichiometrical amount of $Na_2B_4O_7 \cdot 10H_2O$ likewise dissolved in 4,000 cc. of water, stirring, settling, washing by decantation, filtering, and oven drying at 110–120° C. This yields a shiny, dark green granular catalyst which is ready for use.

This catalyst, like other catalysts prepared in accordance with my invention, can be used for the dehydrogenation of hydrocarbons, particularly commercial naphthas, at temperatures between about 600° F. and about 1050° F. However, catalyst temperatures within the range of from 750° F. to 1,000° F. are preferred. Atmospheric pressure is suitable but higher and lower pressures can be used. A space velocity of 0.5 volumes of feed (liquid) per volume of catalyst per hour is suitable but this can be varied greatly.

The catalyst prepared in accordance with my preferred embodiment has been used extensively and it has been found that runs totalling at least several days can be made before the catalyst needs to be revivified. This revivification is accomplished by controlled air blowing to remove the very slight amount of carbon formed.

While I have found that a catalyst consisting of cobalt tetraborate promoted with a small amount of nickel tetraborate is peculiarly satisfactory, good catalysts promoted with nickel tetraborate can be made in which various other metals are substituted for the cobalt. Generally speaking, the most satisfactory metals are those falling within groups II, III and VIII of the Mendelyeev's Periodic Table. In any event the catalyst is prepared by precipitating an aqueous solution of a soluble salt of the metal selected and a soluble nickel salt such as nickel chloride, nitrate or acetate with an aqueous solution containing borate ions. Sodium tetraborate, and potassium tetraborate are the preferred sources of the borate ions.

A satisfactory catalyst can be made by co-precipitating calcium tetraborate and nickel tetraborate. Calcium tetraborate alone is inactive, while in equimolal mixture with nickel tetraborate (co-precipitated) it is even more active than pure nickel tetraborate, evolves much hydrogen, and deposits carbon heavily. However, if the ratio of calcium to nickel is increased, the carbon deposition is greatly reduced and a satisfactory catalyst results although the catalyst is not so good as that containing cobalt tetraborate. A catalyst containing 10 mols of calcium tetraborate per mol of nickel tetraborate gives good results, although still higher ratios of calcium tetraborate to nickel tetraborate are preferred, for instance ratios up to 25 to 1.

Similarly, iron tetraborate co-precipitated with nickel tetraborate gives an unusually good catalyst. Thus, for example, a catalyst prepared by precipitating a solution of 97.2 grams of $$FeCl_3 \cdot 6H_2O$$

and 25 grams of $Ni(C_2H_3O_2)_2 \cdot 4H_2O$ with a solution of $Na_2B_4O_7 \cdot 10H_2O$ followed by washing and drying, gave a smooth dehydrogenation run of twelve hours, although some carbon was precipitated. The molal ratio of iron to nickel in this instance was, roughly, 3½ to 1, and higher ratios appear to be preferable to reduce carbon formation. Ratios similar to those for the mixed nickel-cobalt and nickel-calcium tetraborates can be used.

Another example of these complex catalysts can be made by precipitating a solution of equimolal quantities of nickel and aluminum nitrates with borax. It is probable that the aluminum tetraborate formed hydrolyzes to a considerable extent and that the aluminum is for the most part present in the final catalyst in the form of the oxide. In any event, the co-precipitated material gives good results and deposits no carbon, although the activity decreases somewhat more rapidly than in the case of the cobalt-nickel catalyst. A catalyst has also been prepared using a molal ratio of 3 aluminum to 2 nickel and has given very promising results.

It will be noted that the optimum molal ratio for the two metals which are co-precipitated varies, depending on the metal chosen for use with nickel, but this optimum ratio can readily be determined by experiment in the light of the principles herein set forth.

The precipitation of the mixed compounds can be carried out in various ways. My usual procedure has been to make up solutions of (1) the metal salts and (2) the borax so as to contain stoichiometrical quantities in equal volumes of the two solutions and then mix equal volumes of the two solutions rapidly with little stirring. This results in the precipitation of a gel which after washing and drying gives, in general, a hard shiny granule. However, catalysts can likewise be prepared by adding the borax solution very slowly with stirring and this gives, particularly in the case of the mixed cobalt and nickel tetraborates, a precipitate which filters rapidly and which dries to yield a granular substance which is dull and apparently porous, and which has a much greater volume per unit weight than does the product precipitated by the sudden addition of the borax solution.

I prefer to use the tetraborates, but other borates, particularly the metaborates, can be used. Furthermore, when the tetraborates are subjected to the conditions of the dehydrogenation reaction, some decomposition, dehydration, and/or reduction reactions no doubt take place, so that the catalyst actually present in the reaction chamber may be somewhat different chemically from that originally prepared. However, I refer to my catalyst as borates and tetraborates, since this is their original condition, and I mean thereby to cover the products formed from these materials under the conditions of the reactions in which they are used.

In general my catalysts have the composition $aM_wO_x \cdot bNi_yO_z \cdot cB_2O_3$ where M represents a metal (other than nickel) preferably from groups II, III and VIII of the periodic system, $a$ is a number from 1 to about 25, $b$ is a number from 1 to 3, $c$ is a number from 2 to about 25, $w$ and $x$ are small integers and $y$ and $z$ are small integers, preferably 1. Water of crystallization may be present initially.

Two or three metals instead of one can be used with the nickel, for instance co-precipitated cobalt, iron and nickel tetraborates can be used.

While these catalysts are particularly suited to use in dehydrogenation of hydrocarbons they can be used in the dehydrogenation of other organic compounds. They can also be used in other reactions, for instance the hydrogenation of unsaturated hydrocarbons, oxidation of hydrocarbons and particularly in catalytic cracking. In fact some cracking inevitably occurs during the dehydrogenation of hydrocarbons such as naphthas. The gas produced in dehydrogenation using my catalysts often contains only 60% or 75% hydrogen and some light hydrocarbons such as methane and ethane are produced. If a stock boiling predominately above the gasoline range is used and the temperature is high, for instance 850–1050° F. these catalysts can be used as cracking catalysts. I can therefore speak of my catalyst as hydrocarbon decomposition catalysts.

The dehydrogenation processes and other processes utilizing my improved catalysts are claimed in my copending application Serial No. 179,452, filed December 13, 1937.

My catalysts can be used without catalyst supports but it will be apparent that they can be precipitated and used on supports, for instance clay, kieselguhr, charcoal, etc.

I claim:

1. A hydrocarbon decomposition catalyst comprising co-precipitated tetraborates of two metals, one of said metals being nickel and the second of said metals being selected from the group consisting of calcium, cobalt and iron, said tetraborates being present in the ratio of from about 10 to about 25 mols of the tetraborate of said second metal per mol of nickel tetraborate.

2. A dehydrogenation catalyst comprising intimately associated borates of two metals, one of said metals being nickel and the second of said metals being selected from the group consisting of calcium, cobalt and iron, said borates being present in the ratio of from about 10 to about 25 mols of the borate of said second metal per mol of nickel borate.

3. A hydrocarbon decomposition catalyst comprising mixed nickel and calcium borates.

4. A hydrocarbon decomposition catalyst containing co-precipitated cobalt tetraborate and nickel tetraborate, the molal ratio of the two borates being within the range of from 7½ to 1, to 25 to 1.

5. A hydrocarbon decomposition catalyst containing co-precipitated cobalt tetraborate and nickel tetraborate, the molal ratio of the two borates being approximately 15 to 1.

6. A hydrocarbon decomposition catalyst comprising coprecipitated nickel and iron tetraborates, said tetraborates being present in the ratio of from about 10 to about 25 mols of the iron tetraborate per mol of nickel tetraborate.

LLEWELLYN HEARD.